US011048435B2

(12) United States Patent
Kim

(10) Patent No.: US 11,048,435 B2
(45) Date of Patent: Jun. 29, 2021

(54) MEMORY CONTROLLER AND METHOD OF OPERATING THE SAME

(71) Applicant: SK hynix Inc., Gyeonggi-do (KR)

(72) Inventor: Kwang Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/161,290

(22) Filed: Oct. 16, 2018

(65) Prior Publication Data

US 2019/0303041 A1 Oct. 3, 2019

(30) Foreign Application Priority Data

Mar. 29, 2018 (KR) ........................ 10-2018-0036825

(51) Int. Cl.
*G06F 3/06* (2006.01)
*G06F 13/16* (2006.01)
*G06F 13/22* (2006.01)
*G06F 12/02* (2006.01)
*G06F 13/32* (2006.01)

(52) U.S. Cl.
CPC ............ *G06F 3/0659* (2013.01); *G06F 3/061* (2013.01); *G06F 3/0634* (2013.01); *G06F 3/0656* (2013.01); *G06F 3/0679* (2013.01); *G06F 12/0246* (2013.01); *G06F 13/1673* (2013.01); *G06F 13/1689* (2013.01); *G06F 13/22* (2013.01); *G06F 13/32* (2013.01)

(58) Field of Classification Search
None
See application file for complete search history.

(56) References Cited

U.S. PATENT DOCUMENTS

| | | | | |
|---|---|---|---|---|
| 6,996,819 | B1* | 2/2006 | Alanis ........................ | G06F 8/60 717/173 |
| 9,841,916 | B2* | 12/2017 | Cho ......................... | G06F 3/0638 |
| 9,870,522 | B2* | 1/2018 | Berg ....................... | G06F 3/1285 |
| 2005/0047594 | A1* | 3/2005 | Cho ........................ | G06F 21/80 380/59 |
| 2005/0080874 | A1* | 4/2005 | Fujiwara ................ | G06F 3/0617 709/217 |
| 2007/0174841 | A1* | 7/2007 | Chamberlain ......... | G06F 9/3879 719/310 |
| 2007/0266179 | A1* | 11/2007 | Chavan ................ | G06F 13/4022 709/250 |

(Continued)

FOREIGN PATENT DOCUMENTS

| | | |
|---|---|---|
| KR | 1020140035776 | 3/2014 |
| KR | 1020140036094 | 3/2014 |

*Primary Examiner* — Henry Tsai
*Assistant Examiner* — Christopher A Bartels
(74) *Attorney, Agent, or Firm* — IP & T Group LLP

(57) ABSTRACT

Provided herein may be a memory controller and a method of operating the same. The memory controller may control a write operation of a memory device in response to a write command received from a host. The memory controller includes a host interface, a buffer, and a first processor. The host interface is configured to receive write data corresponding to the write command from the host. The buffer is configured to store the write data. The first processor is configured to control operations of the host interface and the buffer. The first processor is configured to, when the write command is received, set an operation mode based on an operating status of the memory controller.

13 Claims, 13 Drawing Sheets

(56) References Cited

U.S. PATENT DOCUMENTS

| | | | | |
|---|---|---|---|---|
| 2008/0059668 A1* | 3/2008 | Charrat | G06F 13/4243 | 710/110 |
| 2008/0212370 A1* | 9/2008 | Tokiwa | G11C 16/06 | 365/185.09 |
| 2008/0239811 A1* | 10/2008 | Tanaka | G11C 11/5621 | 365/185.11 |
| 2008/0307171 A1* | 12/2008 | Kinoshita | G06F 3/067 | 711/154 |
| 2009/0063593 A1* | 3/2009 | Okabayashi | G06F 3/0607 | |
| 2009/0193180 A1* | 7/2009 | Ito | G06F 13/385 | 711/103 |
| 2009/0235025 A1* | 9/2009 | Kondo | G11C 16/10 | 711/115 |
| 2010/0049878 A1* | 2/2010 | Yu | G06F 13/385 | 710/11 |
| 2011/0103224 A1* | 5/2011 | Nishioka | H04L 5/14 | 370/235 |
| 2011/0241432 A1* | 10/2011 | Nishioka | H04L 25/0272 | 307/80 |
| 2011/0271040 A1* | 11/2011 | Kamizono | G11C 16/10 | 711/103 |
| 2011/0276748 A1* | 11/2011 | Toyama | G06F 9/4403 | 711/103 |
| 2014/0188912 A1* | 7/2014 | Watanabe | G06F 16/2228 | 707/754 |
| 2014/0297980 A1* | 10/2014 | Yamazaki | G06F 3/0614 | 711/162 |
| 2015/0180782 A1* | 6/2015 | Rimmer | H04L 49/3045 | 370/236 |
| 2015/0193360 A1* | 7/2015 | Lu | G06F 13/28 | 710/48 |
| 2018/0059969 A1* | 3/2018 | Fukutomi | G06F 3/0619 | |
| 2018/0314466 A1* | 11/2018 | Suzuki | G06F 3/0604 | |
| 2019/0164598 A1* | 5/2019 | Shukla | G06F 3/0679 | |

* cited by examiner

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2018-0036825, filed on Mar. 29, 2018, the entire disclosure of which is incorporated herein by reference in its entirety.

BACKGROUND

1. Field of Invention

Various embodiments of the present disclosure generally relate to an electronic device. Particularly, the embodiments relate to a memory controller and a method of operating the memory controller.

2. Description of Related Art

A memory device may have a two-dimensional (2D) structure in which strings are horizontally arranged on a semiconductor substrate. Alternatively, the memory device may have a three-dimensional (3D) structure in which strings are vertically stacked on a semiconductor substrate. Since the memory device having a 2D structure has physical scaling limitations (i.e., limitation in the degree of integration), semiconductor manufacturers are producing 3D memory devices that include a plurality of memory cells vertically stacked on a semiconductor substrate. A memory controller may control the operation of the memory device.

SUMMARY

Various embodiments of the present disclosure are directed to a memory controller, which has an improved operating speed.

Various embodiments of the present disclosure are directed to a method of operating a memory controller having an improved operating speed.

An embodiment of the present disclosure may provide for a memory controller for controlling a write operation of a memory device in response to a write command received from a host. The memory controller may include a host interface configured to receive write data corresponding to the write command from the host, a buffer configured to store the write data, and a first processor configured to control operations of the host interface and the buffer. The first processor may be configured to set, when the write command is received, an operation mode based on an operating status of the memory controller.

An embodiment of the present disclosure may provide for a method of operating a memory controller. The method may include receiving a write command from a host, setting an operation mode of first firmware in response to reception of the write command, receiving write data corresponding to the write command through a host interface, and deactivating a busy signal based on the set operation mode.

An embodiment of the present disclosure may provide for a controller for controlling a memory device to perform a write operation. The controller may include a buffer, a host interface and a processor. The host interface may be configured to buffer write data, which is to be programmed into the memory device, in the buffer and to provide a completion signal and activate a busy signal, which prevents reception of subsequent write data, upon completion of the buffering of the write data, when the buffer is determined to have a sufficient available space to buffer data. The processor may be configured to deactivate the busy signal according to the completion signal.

DETAILED DESCRIPTION

Figure 1:
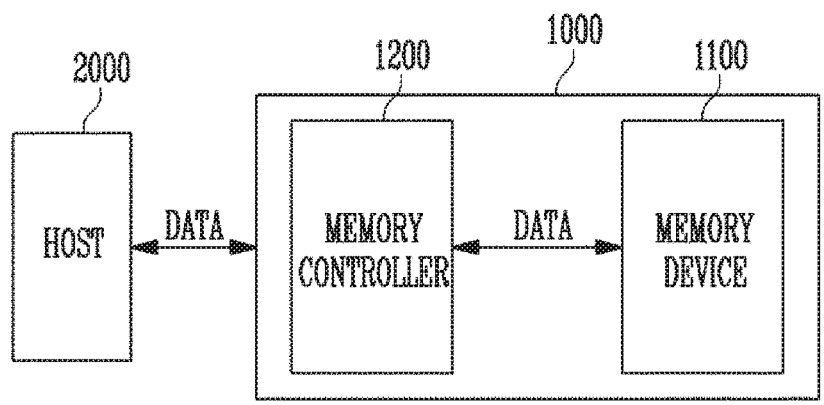
FIG. 1 is a diagram illustrating a memory system including a memory controller according to an embodiment of the present disclosure.

Advantages and features of the present disclosure, and methods for achieving the same will become apparent with reference to embodiments described later in detail together with the accompanying drawings. Accordingly, the present disclosure is not limited to the following embodiments but may be embodied in other forms. Rather, these embodiments are provided so that the present disclosure will be thorough and complete, and will fully convey the technical spirit of the disclosure to those skilled in the art. It is noted that reference to "an embodiment" does not necessarily mean only one embodiment, and different references to "an embodiment" are not necessarily to the same embodiment(s).

It is also noted that in this specification, "connected/coupled" refers to one component not only directly coupling another component but also indirectly coupling another component through an intermediate component. In the specification, when an element is referred to as "comprising" or "including" a component, it does not preclude another component but may further include other components unless the context clearly indicates otherwise.

The terminology used herein is for the purpose of describing particular embodiments only and is not intended to be limiting of the present invention.

As used herein, singular forms may include the plural forms as well and vice versa, unless the context clearly indicates otherwise.

Hereinafter, embodiments in accordance with the present disclosure will be described in detail with reference to the accompanying drawings. Throughout the disclosure, like reference numerals refer to like parts throughout the various figures and embodiments of the present invention. Details of well-known configurations and functions may be omitted to avoid unnecessarily obscuring the gist of the present disclosure.

FIG. 1 is a diagram illustrating a memory system 1000 including a memory controller 1200 according to an embodiment of the present disclosure.

Referring to FIG. 1, the memory system 1000 may include a memory device 1100 which stores data, and the memory controller 1200 which controls the memory device 1100 under the control of a host 2000.

The host 2000 is capable of communicating with the memory system 1000 using an interface protocol, such as Peripheral Component Interconnect-Express (PCI-e or PCIe), Advanced Technology Attachment (ATA), Serial ATA (SATA), Parallel ATA (PATA) or Serial Attached SCSI (SAS). In addition, the interface protocol between the host 2000 and the memory system 1000 is not limited to the above-described examples, and may be one of various interface protocols, such as Universal Serial Bus (USB), Multi-Media Card (MMC), Enhanced Small Disk Interface (ESDI), and integrated Drive Electronics (IDE) interface protocols.

The memory controller 1200 may control the overall operation of the memory system 1000, and may control data exchange between the host 2000 and the memory device 1100. For example, the memory controller 1200 may program or read data by controlling the memory device 1100 in response to a request received from the host 2000. Further, the memory controller 1200 may store information about main memory blocks and sub-memory blocks included in the memory device 1100, and may select the memory device 1100 so that a program operation is performed on a main memory block or a sub-memory block depending on the amount of data loaded for the program operation. By way of example and not limitation, the memory device 1100 may include a double data rate synchronous dynamic random access memory (DDR SDRAM), low power double data rate fourth generation (LPDDR4) SDRAM, a graphics double data rate (GDDR) SDRAM, a low power DDR (LPDDR) SDRAM, a Rambus DRAM (RDRAM) or a flash memory. The detailed configuration of the memory controller 1200 will be illustratively described later with reference to FIG. 6.

Meanwhile, the memory device 1100 may perform a program operation, a read operation or an erase operation under the control of the memory controller 1200. The detailed configuration and operation of the memory device 1100 will be described later with reference to FIGS. 2 to 5.

Figure 2:
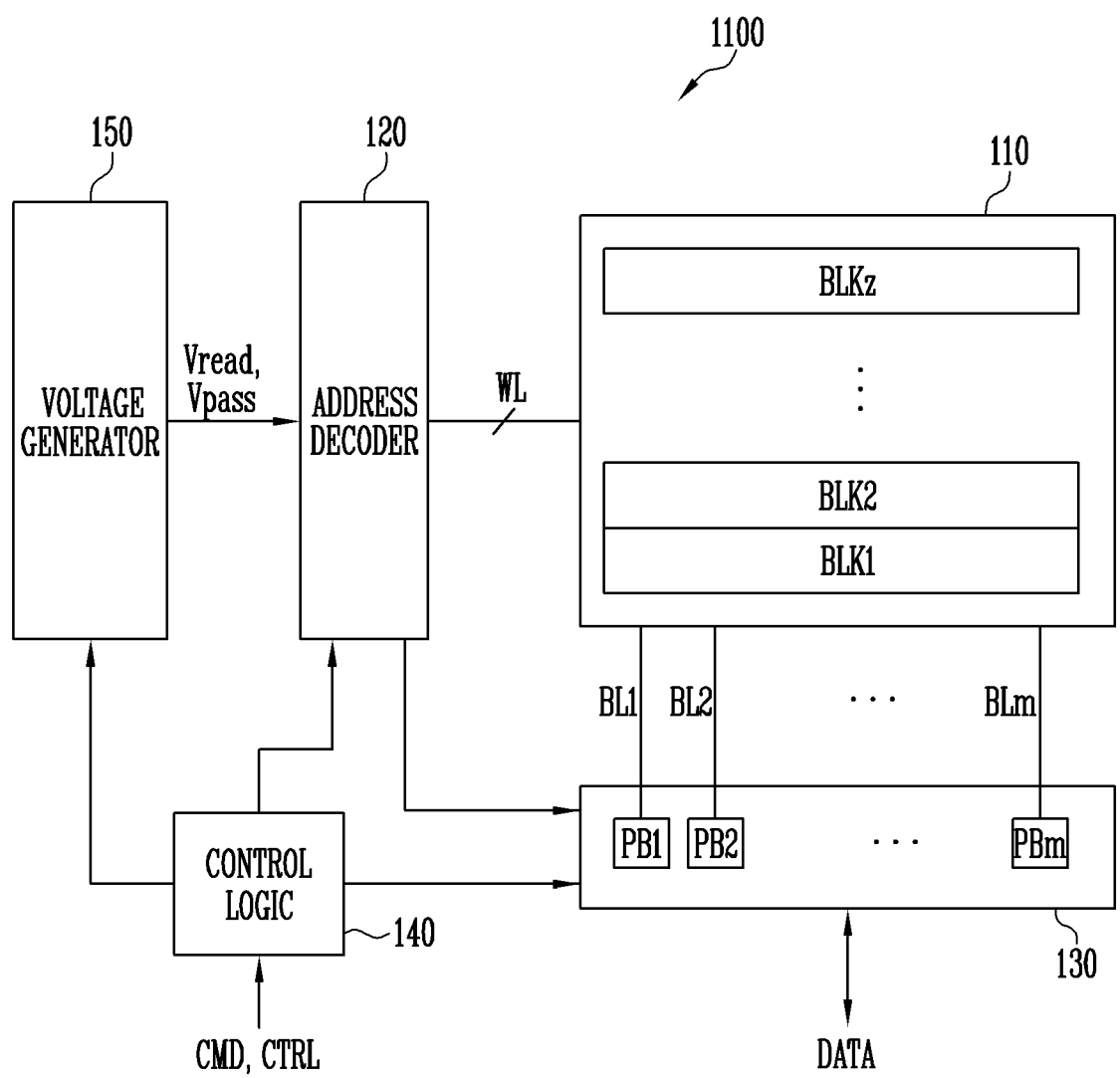
FIG. 2 is a block diagram illustrating in detail a memory device of FIG. 1.

FIG. 2 is a block diagram illustrating in detail the memory device 1100 of FIG. 1.

Referring to FIG. 2, the memory device 1100 includes a memory cell array 110, an address decoder 120, a read and write circuit 130, a control logic 140, and a voltage generator 150. The memory device 1100 of FIG. 2 may correspond to the memory device 1100 of FIG. 1.

The memory cell array 110 includes a plurality of memory blocks BLK1 to BLKz. The memory blocks BLK1 to BLKz may be coupled to the address decoder 120 through word lines WL. The memory blocks BLK1 to BLKz may be coupled to the read and write circuit 130 through bit lines BL1 to BLm. Each of the memory blocks BLK1 to BLKz includes a plurality of memory cells. In an embodiment, the plurality of memory cells may be nonvolatile memory cells, and may be implemented as nonvolatile memory cells having a vertical channel structure. The memory cell array 110 may be implemented as a memory cell array having a two-dimensional (2D) structure. In an embodiment, the memory cell array 110 may be implemented as a memory cell array having a three-dimensional (3D) structure. Each of the memory cells included in the memory cell array may store at least one bit of data. In an embodiment, each of the memory cells included in the memory cell array 110 may be a single-level cell (SLC), which stores one bit of data. In an embodiment, each of the memory cells included in the memory cell array 110 may be a multi-level cell (MLC), which stores two bits of data. In an embodiment, each of the memory cells included in the memory cell array 110 may be a triple-level cell, which stores three bits of data. In an embodiment, each of the memory cells included in the memory cell array 110 may be a quad-level cell, which stores four bits of data. In various embodiments, the memory cell array 110 may include a plurality of memory cells, each of which stores 5 or more bits of data.

The address decoder 120, the read and write circuit 130, the control logic 140, and the voltage generator 150 may function as a peripheral circuit for driving the memory cell array 110. The peripheral circuit may perform a read operation, a write operation, and an erase operation on the memory cell array 110 under the control of the control logic 140. The address decoder 120 is coupled to the memory cell array 110 through the word lines WL. The address decoder 120 may be operated under the control of the control logic 140. The address decoder 120 may receive addresses through the input/output buffer (not illustrated) provided in the memory device 1100. When power is supplied to the memory device 1100, pieces of information stored in a Content Addressable Memory (CAM) block are read by the peripheral circuit, and the peripheral circuit may control the memory cell array so that a data input/output operation of memory cells is performed based on set conditions depending on the read information.

The address decoder 120 may decode a block address, among the received addresses. The address decoder 120 selects at least one memory block based on the decoded block address. When a read voltage application operation is performed during a read operation, the address decoder 120 may apply a read voltage Vread, generated by the voltage generator 150, to a selected word line of a selected memory block, and may apply a pass voltage Vpass to remaining word lines, that is, unselected word lines. During a program verify operation, the address decoder 120 may apply a verify voltage, generated by the voltage generator 150, to a selected word line of a selected memory block, and may apply the pass voltage Vpass to unselected word lines.

The address decoder 120 may decode a column address, among the received addresses. The address decoder 120 may transmit the decoded column address to the read and write circuit 130.

The read and program operations of the memory device 1100 are each performed on a page basis. Addresses received at the request of read and program operations may include a block address, a row address and a column address. The address decoder 120 may select one memory block and one word line in accordance with the block address and the row address. The column address may be decoded by the address decoder 120, and may then be provided to the read and write circuit 130. In the present specification, memory cells coupled to a single word line may be referred to as a "physical page."

The address decoder 120 may include a block decoder, a row decoder, a column decoder, an address buffer, etc.

The read and write circuit 130 includes a plurality of page buffers PB1 to PBm. The read and write circuit 130 may be operated as a "read circuit" during a read operation of the memory cell array 110 and as a "write circuit" during a write operation thereof. The plurality of page buffers PB1 to PBm are coupled to the memory cell array 110 through the bit lines BL1 to BLm. During a read or program verify operation, in order to sense threshold voltages of the memory cells, the page buffers PB1 to PBm may continuously supply sensing current to the bit lines coupled to the memory cells while each of the page buffers PB1 to PBm senses, through a sensing node, a change in the amount of flowing current depending on the program state of a corresponding memory cell and latches it as sensing data. The read and write circuit 130 is operated in response to page buffer control signals outputted from the control logic 140.

During a read operation, the read and write circuit 130 may sense data stored in the memory cells and temporarily store read data, and may then output data to the input/output buffer (not illustrated) of the memory device 1100. In an embodiment, the read and write circuit 130 may include a column select circuit or the like as well as the page buffers (or page resistors).

The control logic 140 is coupled to the address decoder 120, the read and write circuit 130, and the voltage generator 150. The control logic 140 may receive a command CMD and a control signal CTRL through the input/output buffer (not illustrated) of the memory device 1100. The control logic 140 may control the overall operation of the memory device 1100 in response to the control signal CTRL. The control logic 140 may output a control signal for controlling a precharge potential level at the sensing node of the plurality of page buffers PB1 to PBm. The control logic 140 may control the read and write circuit 130 to perform a read operation of the memory cell array 110.

The voltage generator 150 may generate a read voltage Vread and a pass voltage Vpass required for a read operation in response to a control signal outputted from the control logic 140. The voltage generator 150 may include a plurality of pumping capacitors for receiving an internal supply voltage to generate a plurality of voltages having various voltage levels, and may generate a plurality of voltages by selectively enabling the plurality of pumping capacitors under the control of the control logic 140.

Figure 3:
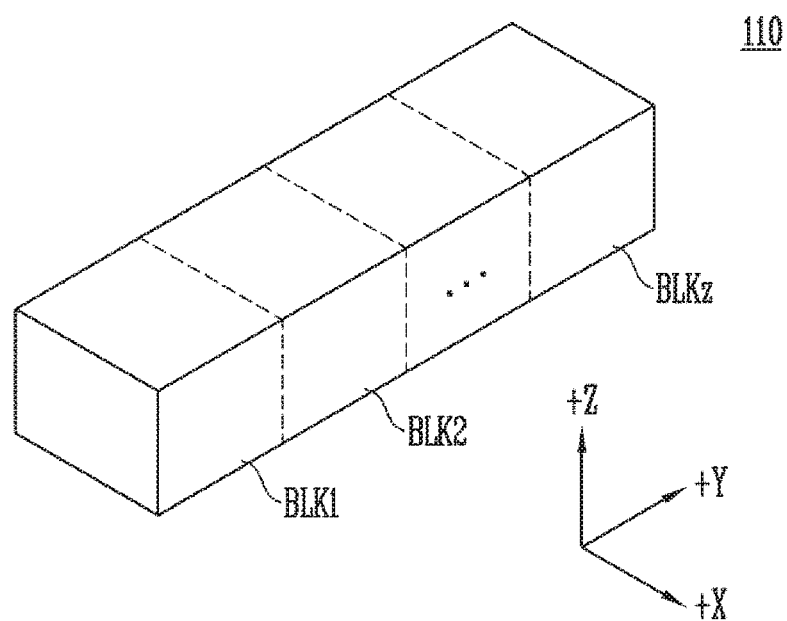
FIG. 3 is a diagram illustrating an embodiment of a memory cell array of FIG. 2.

FIG. 3 is a diagram illustrating an embodiment of the memory cell array 110 of FIG. 2.

Referring to FIG. 3, the memory cell array 110 may include a plurality of memory blocks BLK1 to BLKz. Each memory block may have a two-dimensional (2D) or a three-dimensional (3D) structure. When the memory blocks have a 3D structure as shown in FIG. 3, each memory block includes a plurality of memory cells stacked on a substrate. Such memory cells are arranged along a positive X (+X) direction, a positive Y (+Y) direction, and a positive Z (+Z) direction. The structure of each memory block will be described in detail below with reference to FIGS. 4 and 5.

Figure 4:
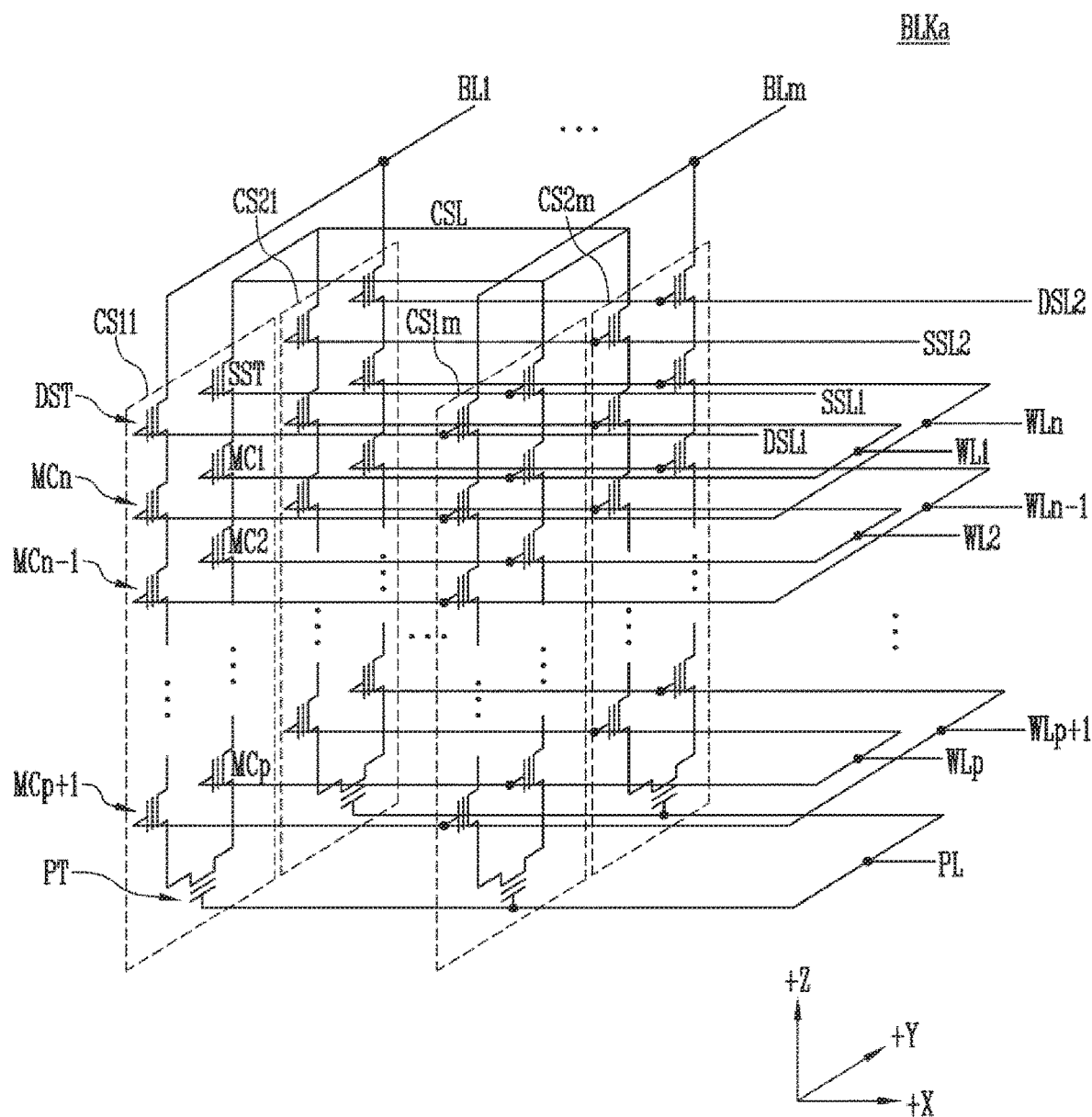
FIG. 4 is a circuit diagram illustrating any one memory block BLKa of memory blocks BLK1 to BLKz of FIG. 3.

FIG. 4 is a circuit diagram illustrating any one memory block BLKa of the memory blocks BLK1 to BLKz of FIG. 3.

Referring to FIG. 4, the memory block BLKa may include a plurality of cell strings CS11 to CS1*m* and CS21 to CS2*m*. In an embodiment, each of the cell strings CS11 to CS1*m* and CS21 to CS2*m* may be formed in a 'U' shape. In the memory block BLKa, m cell strings are arranged in a row direction (i.e. a positive (+) X direction). In FIG. 4, two cell strings are illustrated as being arranged in a column direction (i.e. a positive (+) Y direction). However, this illustration is made for convenience of description, and it will be understood that the number of cell strings arranged in the column direction may vary depending on design.

Each of the plurality of cell strings CS11 to CS1*m* and CS21 to CS2*m* includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is connected between the common source line CSL and memory cells MC1 to MCp.

In an embodiment, the source select transistors of cell strings arranged in the same row are coupled to a source select line extended in a row direction, and source select transistors of cell strings arranged in different rows are coupled to different source select lines. In FIG. 4, source select transistors of cell strings CS11 to CS1*m* in a first row are coupled to a first source select line SSL1. The source select transistors of cell strings CS21 to CS2*m* in a second row are coupled to a second source select line SSL2.

In an embodiment, source select transistors of the cell strings CS11 to CS1*m* and CS21 to CS2*m* may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite a positive (+) Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

The gate of the pipe transistor PT of each cell string is coupled to a pipeline PL.

The drain select transistor DST of each cell string is connected between the corresponding bit line and the memory cells MCp+1 to MCn. The cell strings in a row direction are coupled to drain select lines extended in a row direction. Drain select transistors of cell strings CS11 to CS1m in the first row are coupled to a first drain select line DSL1. Drain select transistors of cell strings CS21 to CS2m in a second row are coupled to a second drain select line DSL2.

Cell strings arranged in a column direction are coupled to bit lines extended in a column direction. In FIG. 4, cell strings CS11 and CS21 in a first column are coupled to a first bit line BL1. Cell strings CS1m and CS2m in an m-th column are coupled to an m-th bit line BLm.

The memory cells coupled to the same word line in cell strings arranged in a row direction constitute a single page. For example, memory cells coupled to the first word line WL1, among the cell strings CS11 to CS1m in the first row, constitute a single page. Memory cells coupled to the first word line WL1, among the cell strings CS21 to CS2m in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines, instead of first to m-th bit lines BL1 to BLm, may be provided. Further, even-numbered cell strings, among the cell strings CS11 to CS1m or CS21 to CS2m arranged in a row direction, may be coupled to the even bit lines, respectively, and odd-numbered cell strings, among the cell strings CS11 to CS1m or CS21 to CS2m arranged in the row direction, may be coupled to the odd bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the one or more dummy memory cells are provided to reduce an electric field between the drain select transistor DST and the memory cells MCp+1 to MCn. When more dummy memory cells are provided, the reliability of the operation of the memory block BLKa may be improved, but the size of the memory block BLKa also increases. When fewer memory cells are provided, the size of the memory block BLKa may be reduced, but the reliability of the operation of the memory block BLKa may deteriorates.

In order to efficiently control the one or more dummy memory cells, each of the dummy memory cells may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 5:
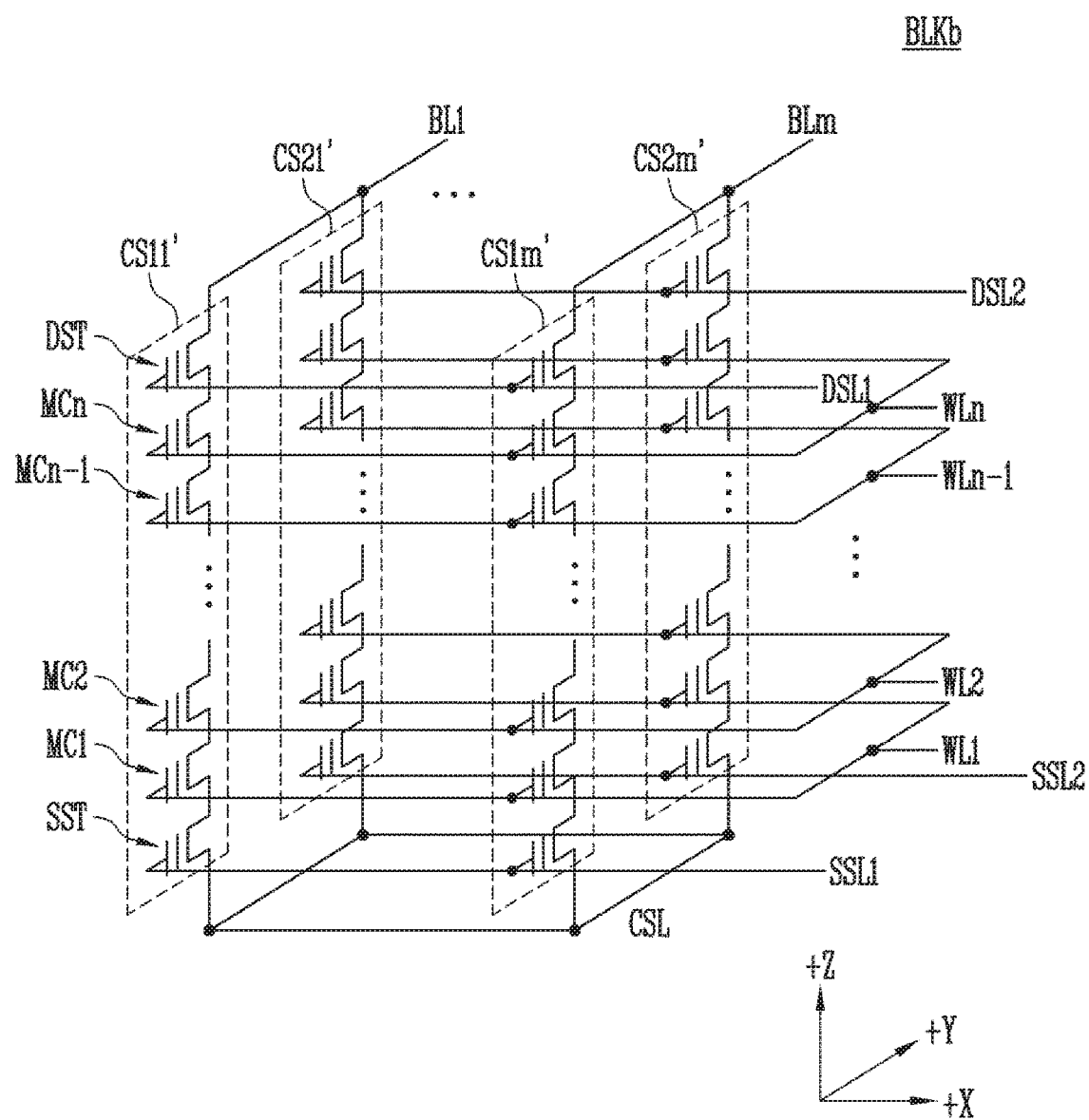
FIG. 5 is a circuit diagram illustrating an example of any one memory block BLKb of the memory blocks BLK1 to BLKz of FIG. 3.

FIG. 5 is a circuit diagram illustrating an example of any one memory block BLKb of the memory blocks BLK1 to BLKz of FIG. 3.

Referring to FIG. 5, the memory block BLKb may include a plurality of cell strings CS11' to CS1m' and CS21' to CS2m'. Each of the plurality of cell strings CS11' to CS1m' and CS21' to CS2m' Is extended along a positive Z (+Z) direction. Each of the cell strings CS11' to CS1m' and CS21' to CS2m' may include at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1m' arranged in a first row are coupled to a first source select line SSL1. Source select transistors of cell strings CS21' to CS2m' arranged in a second row are coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extended in a row direction. The drain select transistors of the cell strings CS11' to CS1m' in the first row are coupled to a first drain select line DSL1. The drain select transistors of the cell strings CS21' to CS2m' in the second row are coupled to a second drain select line DSL2.

As a result, the memory block BLKb of FIG. 5 has a circuit similar to that of the memory block BLKa of FIG. 4, expect that a pipe transistor PT included in each cell string in the memory block BLKa of FIG. 4 may be excluded in the memory block BLKb of FIG. 5.

In an embodiment, even bit lines and odd bit lines, instead of first to m-th bit lines BL1 to BLm, may be provided. Further, even-numbered cell strings, among the cell strings CS11' to CS1m' or CS21' to CS2m' arranged in a row direction, may be coupled to the even bit lines, respectively, and odd-numbered cell strings, among the cell strings CS11' to CS1m' or CS21' to CS2m' arranged in the row direction, may be coupled to the odd bit lines, respectively.

In an embodiment, one or more of the first to n-th memory cells MC1 to MCn may be used as dummy memory cells. For example, the one or more dummy memory cells are provided to reduce an electric field between the source select transistor SST and the memory cells MC1 to MCn. Alternatively, the one or more dummy memory cells are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer memory cells are provided, the size of the memory block BLKb is reduced, but the reliability of the operation of the memory block BLKb may be deteriorated.

In order to efficiently control the one or more dummy memory cells, each of the dummy memory cells may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 6:
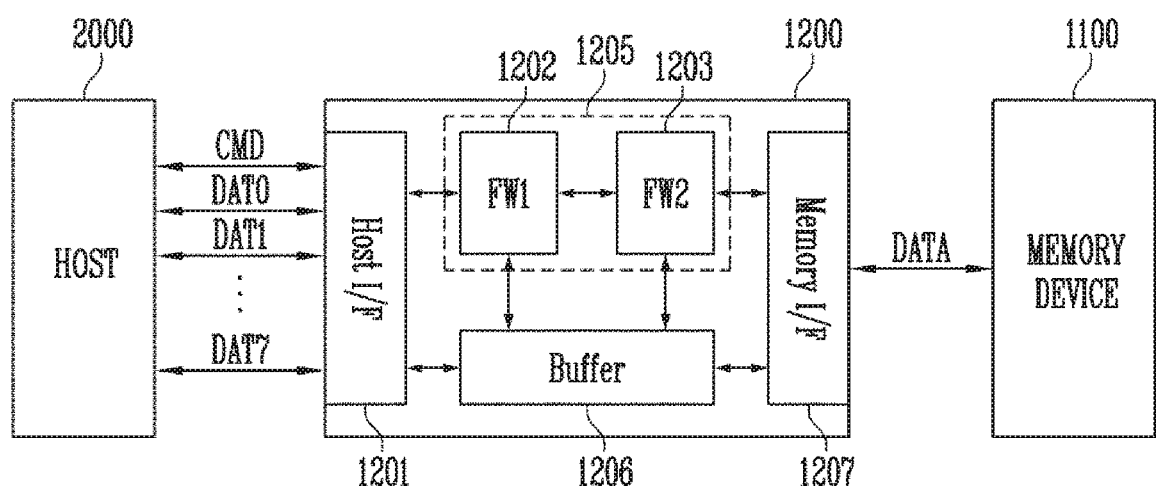
FIG. 6 is a block diagram illustrating in detail the memory controller 1200 of FIG. 1.

FIG. 6 is a block diagram illustrating in detail the memory controller 1200 of FIG. 1.

Referring to FIG. 6, the memory controller 1200 may include a host interference (Host I/F) 1201, a processing component 1205, a buffer 1206, and a memory interface (Memory I/F) 1207.

The processing component 1205 may control the overall operation of the memory controller 1200. The buffer 1206 may operate as a working memory of the memory controller 1200, and may also operate as a cache memory. In an example embodiment, the buffer memory 1206 may be implemented as a static random access memory (SRAM). In an embodiment, the buffer memory 1206 may be implemented as a dynamic random access memory (DRAM).

The processing component 1205 may include a first processor 1202 and a second processor 1203. As illustrated in FIG. 6, the first processor 1202 may execute first firmware FW1. Further, the second processor 1203 may execute second firmware FW2.

By the first firmware FW1, the first processor 1202 may control an operation of receiving write data from the host 2000 through the host interface 1201. In detail, the first processor 1202 may store the write data, received from the host 2000, in the buffer 1206 by controlling the host interface 1201 and the buffer 1206. Further, by means of the first firmware FW1, the first processor 1202 may transfer read data, stored in the buffer 1206, to the host 2000 through the host interface 1201.

The second firmware FW2 executed by the second processor 1203 may include a Flash Translation Layer (hereinafter, referred to as an "FTL"). The FTL provides an interface between an external device and the memory device 1100 so that the memory device 1100 is efficiently used. For example, the FTL may translate a logical address received from the external device, for example, the host 2000, into a physical address that is used by the memory device 1100. The FTL may perform the above-described address translation operation through a mapping table. In an embodiment, a logical address indicates the virtual location of the memory device 1100 identified by the host 2000, and the physical address indicates the actual location of the memory device 1100. The mapping table has relationship information between the virtual location and the actual location through the logical address system and the physical address system.

The FTL may perform an operation, such as wear leveling or garbage collection (GC), so that the memory device 1100 may be efficiently used. In an example, wear leveling may be an operation of managing the number of program/erase cycles of each of a plurality of memory blocks included in the memory device 1100 so that the numbers of program/erase cycles of respective memory blocks become equal. In an example, garbage collection (GC) may be an operation of moving valid pages of certain memory blocks, among the plurality of memory blocks included in the memory device 1100, to another memory block, and then erasing the certain memory blocks. The erased certain memory blocks may be used as free blocks. The FTL may secure free blocks of the memory device 1100 by performing garbage collection.

The first processor 1202 and the second processor 1203 may be implemented as different independent devices or may be integrated into a single processor. In this case, the processing unit 1205 may be configured as a single processor, and may execute the first firmware FW1 and the second firmware FW2.

The memory controller 1200 may communicate with the external device (or the host 2000) through the host interface 1201. For example, the host interface 1201 may include at least one of various interfaces, such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer small interface (SCSI), enhanced small disk interface (ESDI), integrated drive electronics (IDE), firewire, universal flash storage (UFS) interfaces.

In an embodiment, the host interface 1201 may include a direct memory access (DMA) controller (not illustrated). As such a DMA scheme is used, the host 2000 engages only in the initial stage of data transmission, and does not engage in a transmission procedure. Accordingly, the host 2000 may perform other operations while data is transmitted, thus improving operating efficiency. Meanwhile, when the host interface 1201 transmits data through the DMA scheme, the DMA controller of the host interface 1201 may transfer a transmission completion signal to the first processor 1202 when the transmission of data is completed.

Meanwhile, the memory controller 1200 may receive a command from the host 2000 through a command line CMD. Further, the memory controller 1200 may transfer a response signal in response to the provided command to the host 2000 through the command line CMD.

Meanwhile, the memory controller 1200 may receive data from the host 2000 or transfer data to the host 2000 through data lines DAT0 to DAT7. The data received from the host 2000 may be stored in the buffer 1206 through the host interface 1201.

The memory controller 1200 may communicate with the memory device 1100 through the memory interface 1207. In an example, the memory interface 1207 may include a NAND interface. The data read from the memory device 1100 may be stored in the buffer 1206 through the memory interface 1207. That is, the host interface 1201, the buffer 1206, and the memory interface 1207 may configure a data path between the host 2000 and the memory device 1100.

Although not illustrated in FIG. 6, the memory controller 1200 may further include elements, such as a randomizer (not illustrated) for data randomizing and an error correction circuit (not illustrated) for data error correction. Although not illustrated in FIG. 6, the memory controller 1200 may further include a read only memory (ROM). The ROM may store various types of information required for the operation of the memory controller 1200 in the form of firmware.

Figure 7:
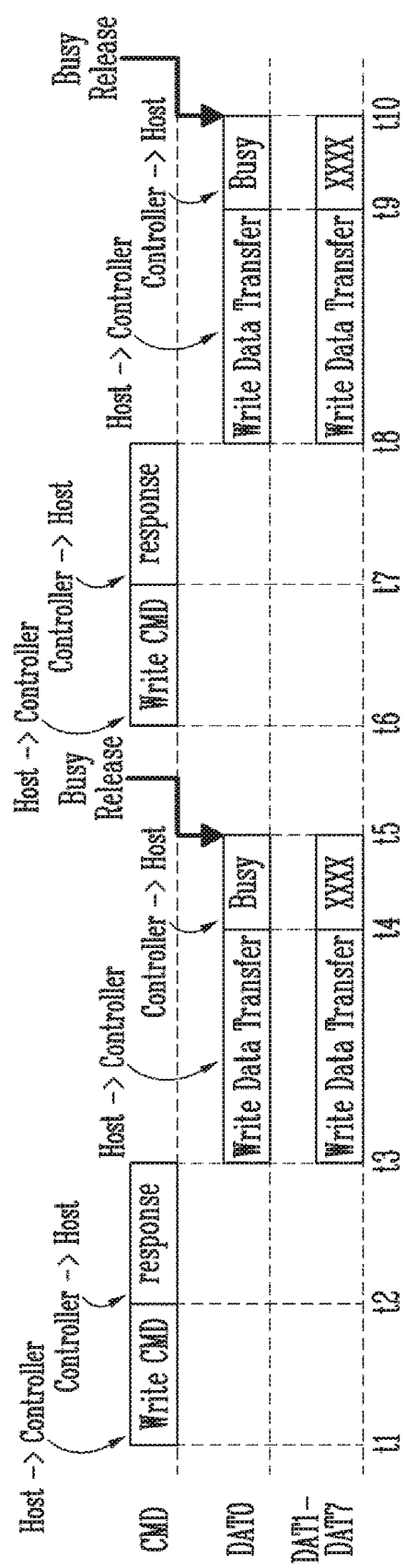
FIG. 7 is a timing diagram for explaining a write operation in a normal mode.

FIG. 7 is a timing diagram explaining a write operation in a normal mode. Below, the write operation in the normal mode will be described with reference to FIGS. 6 and 7.

Referring to FIG. 7, a write command Write CMD is transferred from the host 2000 to the memory controller 1200 through the command line CMD at time t1. At time t2, the memory controller 1200 transfers a response signal to the write command Write CMD to the host 2000 through the command line CMD. Thereafter, from time t3, write data is transferred from the host 2000 to the memory controller 1200 through the data lines DAT0 to DAT7.

In detail, the write data is transferred from the host 2000 to the buffer 1206 through the host interface 1201 of FIG. 6. The first processor 1202 controls the operation of the host interface 1201 and the buffer 1206 based on an operation by the first firmware FW1. When the transfer of the write data is initiated, the first processor 1202 verifies whether the transfer of the write data has been completed by polling the host interface 1201 in the normal mode. The term "polling" may mean a scheme in which one device (or program or firmware) periodically checks the status of another device (or program or firmware) for the purpose of avoiding collisions or processing synchronization, and then performs data processing, such as transmission or reception of data, when the checked status satisfies a predetermined condition.

That is, in the normal mode, the first processor 1202 verifies whether the transfer of write data has been completed using a scheme for periodically checking the status of the host interface 1201. For this operation, when the transfer of the write data is completed, a busy signal Busy is activated at time t4. The busy signal Busy may be transferred from the memory controller 1200 to the host 2000 through the first data line DAT0, among the data lines DAT0 to DAT7. In this case, remaining data lines DAT1 to DAT7 may not transfer data or may transmit dummy data. Thereafter, when the activation of the busy signal Busy is terminated (noted as "Busy Release" in FIG. 7), the host 2000 may transfer again the write command Write CMD to the memory controller 1200 through the command line CMD at time t6. Thereafter, at time t7, the memory controller 1200 transfers a response signal to the write command Write CMD to the host 2000 through the command line CMD. Since time t8, the write data is transferred from the host 2000 to the memory controller 1200 through the data lines DAT0 to DAT7. When the transfer of the write data is completed, the busy signal Busy is activated during a period from time t9 to time t10.

In accordance with the operation method performed in the normal mode, illustrated in FIG. 7, the busy signal Busy may be activated to perform the internal operation of the memory controller 1200. For example, when the reception of the write data is completed, the memory controller 1200 may internally perform another background operation. When the transfer of the write data is initiated, the first firmware FW1 executed by the first processor 1202 may verify whether the transfer of the write data has been completed by polling the status of the host interface 1201. After it is verified that the transfer of the write data has been completed, the first firmware FW1 checks the status of the buffer 1206, and then determines whether it is possible to store additional data in the buffer 1206 or whether to flush data, stored in the buffer 1206, into the memory device 1100 because data is accumulated in the buffer 1206.

When the reception of the write data is completed, the buffer 1206 in the memory controller 1200 may not receive a next write command because the buffer 1206 is full of data. In this case, the first firmware FW1 executed by the first processor 1202 may request the second firmware FW2 executed by the second processor 1203 to flush the write data, stored in the buffer 1206, into the memory device 1100. In response to the flush request, the second firmware FW2 executed by the second processor 1203 may transfer the write command and data to the memory device 1100 so that at least a part of the write data, stored in the buffer 1206, is programmed to the memory device 1100. Until an available space is secured in the buffer 1206 through the above procedure, the first firmware FW1 may maintain the busy signal Busy in an activate state. When the flush of data is performed and the available space of the buffer 1206 is secured, the first firmware FW1 may terminate the active state of the busy signal Busy ("Busy Release").

Meanwhile, when an available space is sufficient in the buffer 1206 at a time point at which the reception of write data is completed, the first firmware FW1 may terminate the active state of the busy signal Busy ("Busy Release") without requesting the second firmware FW2 to perform a flush operation. Even if the available space of the buffer 1206 is sufficient, a delay time may occur during a period from time t4 or t9 which is the time point at which the transmission of the write data is completed to a time point at which the first firmware FW1 verifies the completion of transmission of the write data through the polling of the host interface 1201. During this delay time, the busy signal Busy is maintained in the active state. In this case, although there is no need to maintain the busy signal, overhead caused by polling may occur, and thus the period from time t4 to time t5 (i.e., duration) during which the busy signal Busy is maintained may be slightly increased.

When the size of the write data is large, for example, when a sequential write operation is performed, such an increase in the duration of the busy signal (e.g., period from t4 to t5 or period from t9 to t10) does not greatly influence the speed of the program operation because the duration of the busy signal is shorter than a data transmission time (e.g., period from t3 to t4 or period from t8 to t9) in the aspect of proportions thereof. However, in the case of a random write operation, since the size of write data is small, the duration of the busy signal Busy (e.g., period from t4 to t5 or from t9 to t10) is longer than the data transmission time (e.g., period from t3 to t4 or from t8 to t9). Accordingly, when the random write operation is repetitively performed, the duration of the busy signal Busy (e.g., period from t4 to t5 or from t9 to t10) generated due to the polling of the host interface 1201 may deteriorate the operating speed of the memory system 1000.

In accordance with the memory controller and the method of operating the memory controller 1200 according to embodiments of the present disclosure, the operation mode of the first firmware FW1 is set to any one of a normal mode and an interrupt mode depending on the operating status of the second firmware FW2 when the write command Write CMD is received. When the operation mode of the first firmware FW1 is set to the interrupt mode, the host interface 1201 transfers an interrupt signal to the first processor 1202 when the transfer of the write data is completed. The interrupt signal may be a signal indicating that direct memory access has been completed. When the first processor 1202 receives the interrupt signal, the first processor 1202 suspends a task currently being performed, and primarily processes the deactivation of the busy signal. That is, in a case where the first firmware FW1 is operated in the interrupt mode, the activation of the busy signal is immediately terminated without a delay when the transfer of the write data is completed, the operating speed of the memory system may be improved.

When the first firmware FW1 is operated in the normal mode, the first firmware FW1 verifies whether the transfer of write data has been completed by polling the host interface 1201. Accordingly, an overhead period depending on a polling cycle and an overhead period depending on whether an additional operation (e.g., buffer flush) is to be performed after the completion of transfer of write data may occur. After the above-described overhead periods have elapsed, the activation of the busy signal Busy is terminated. When the first firmware FW1 is operated in the interrupt mode, the first firmware FW1 primarily terminates the activation of the busy signal Busy based on an interrupt signal without polling the host interface 1201. Therefore, when the firmware FW1 is operated in the interrupt mode, the delay time of the busy signal Busy which is maintained depending on the above-described overhead periods may be shortened, and thus the operating speed of the memory system may be improved.

Figure 8:
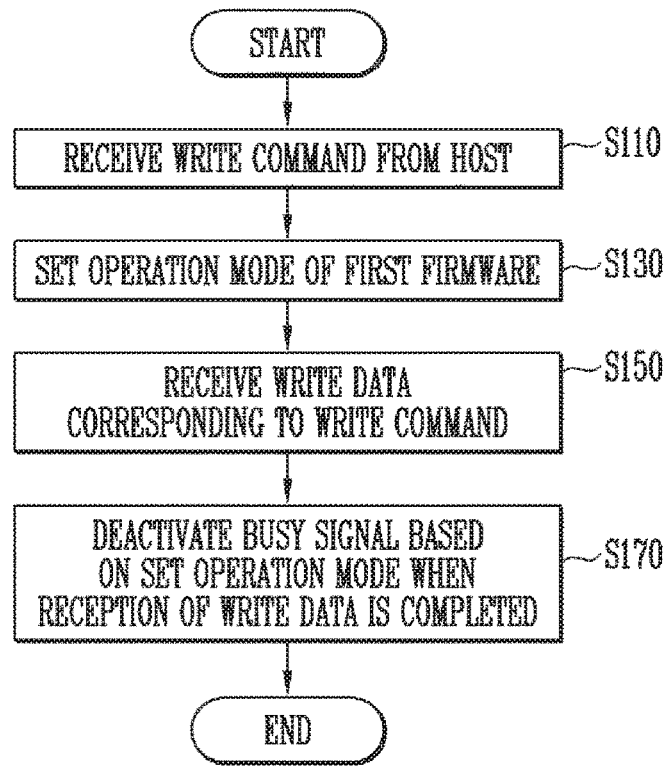
FIG. 8 is a flowchart describing a method of operating a memory controller according to an embodiment of the present disclosure.

FIG. 8 is a flowchart describing a method of operating the memory controller 1200 according to an embodiment of the present disclosure.

Referring to FIG. 8, the memory controller 1200 receives a write command Write CMD from the host 2000 at step S110. As illustrated in FIG. 7, the memory controller 1200 may receive the write command Write CMD through the command line CMD during a period (e.g., period from t1 to t2 or from t6 to t7). Although not illustrated in FIG. 8, the memory controller 1200 may send a response signal to the host 2000 in response to the write command Write CMD at step S110. As illustrated in FIG. 7, the memory controller 1200 may transfer the response signal to the host 2000 through the command line CMD during a period from t2 to t3 or from t7 to t8 in response to the received write command Write CMD.

Thereafter, at step S130, the memory controller 1200 sets the operation mode of the first firmware FW1. In detail, the first processor 1202 of the memory controller 1200 may set the operation mode of the first firmware FW1. For example, at step S130, the operation mode of the first firmware FW1 may be set to an interrupt mode or to a normal mode. The step S130 will be described in more detail later with reference to FIG. 9.

Thereafter, at step S150, the memory controller 1200 receives write data corresponding to the write command Write CMD from the host 2000. During a period from t3 to t4 or from t8 to t9 illustrated in FIG. 7, the write data may be transferred from the host 2000 to the memory controller 1200.

Next, at step S170, when the reception of the write data is completed, the memory controller 1200 deactivates a busy signal based on the operation mode set at step S130. The step S170 will be described in more detail later with reference to FIG. 10.

Figure 9:
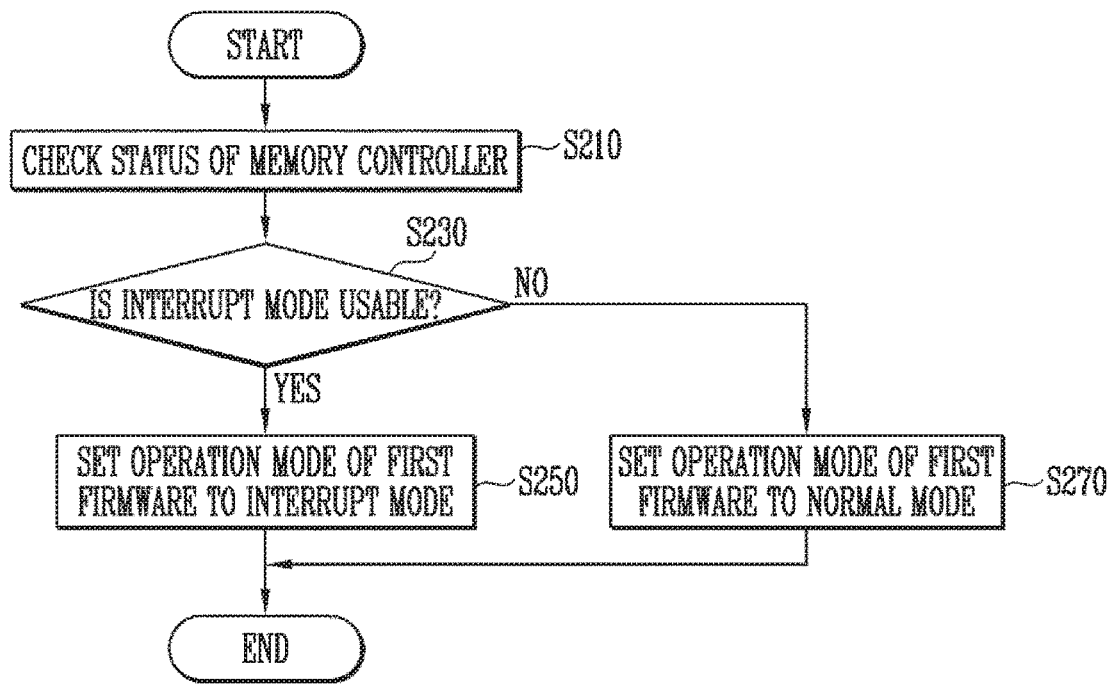
FIG. 9 is a flowchart describing an example of setting the operation mode of first firmware described in FIG. 8.

FIG. 9 is a flowchart describing an example of step S130 of setting the operation mode of first firmware FW1 illustrated in FIG. 8.

Referring to FIG. 9, the operating status of the memory controller 1200 is checked at step S210. In an example, the status of the buffer 1206 may be checked by the first processor 1202 which executes the first firmware FW1. At step S210, the first processor 1202 may detect a current size of the available space of the buffer 1206 through the check.

At step S230, whether an interrupt mode is usable is determined based on the operating status of the memory controller 1200.

For example, when it is impossible to receive additional write data due to insufficiency of the available space of the buffer 1206 (that is, the buffer 1206 is full of data), there is a need to maintain the busy signal Busy. In this case, since the interrupt mode cannot be used as a result of the determination at step S230 (that is, "NO" at step S230), the operation mode of the first firmware may be set to the normal mode at step S270.

In contrast, when the available space of the buffer 1206 is sufficient, there is no need to maintain the busy signal Busy. In this case, since the interrupt mode is usable as a result of the determination at step S230 (that is, "YES" at step S230), the operation mode of the first firmware may be set to the interrupt mode at step S250.

In detail, when the size of the available space of the buffer 1206 is equal to or greater than a preset threshold, it may be determined that the available space is sufficient in the buffer 1206 and thus the interrupt mode is usable, and then the operation mode of the first firmware may be set to the interrupt mode at step S250. In contrast, when the size of the available space of the buffer 1206 is less than the preset threshold, it may be determined that the available space is not sufficient in the buffer 1206 and thus the interrupt mode is unusable, and then the operation mode of the first firmware may be set to the normal mode at step S270.

Figure 10A:
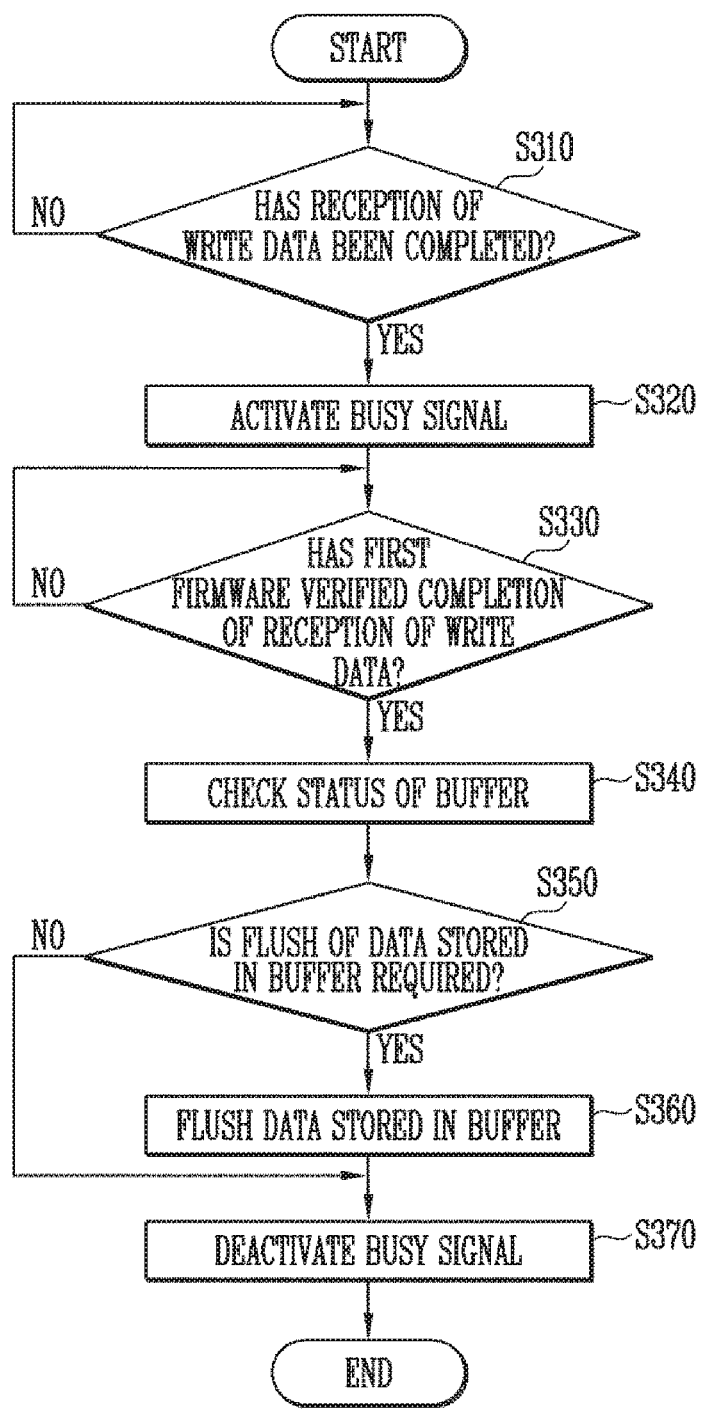
FIG. 10A is a flowchart describing an example of deactivating a busy signal in a normal mode described in FIG. 8.

FIG. 10A is a flowchart describing an example of step S170 of deactivating a busy signal in a normal mode.

Referring to FIG. 10A, when the first firmware FW1 is operated in the normal mode, it is determined whether the reception of write data has been completed at step S310. Step S310 may be performed by the host interface 1201. When the reception of write data is not completed (that is, "NO" at step S310), the host interface 1201 may continue to receive the write data.

When the reception of write data is completed (that is, "YES" at step S310), a busy signal is activated at step S320. Step S320 of activating the busy signal may be performed by the host interface 1201. Thereafter, at step S330, it is determined whether the first firmware FW1 has verified the completion of reception of the write data. FIG. 10A illustrates, as an example, deactivating a busy signal in the normal mode. The step S330 may be performed by the first firmware FW1 polling the host interface 1201. When the first firmware FW1 does not verify the completion of reception of write data (that is, "NO" at step S330), the first firmware FW1 may perform step S330 by repetitively polling the host interface 1201 at regular intervals.

When the first firmware FW1 verifies the completion of reception of write data (that is, "YES" at step S330), the first firmware FW1 may check the status of the buffer 1206 at step S340. Thereafter, at step S350, it is determined whether a flush of data stored in the buffer 1206 is required. When the flush of data is required (that is, "YES" at step S350), the process proceeds to step S360 where the data stored in the buffer 1206 may be flushed into the memory device 1100. Thereafter, when the flush of data is completed, and the available space of the buffer 1206 is secured, the first firmware FW1 may deactivate the busy signal at step S370, and may then receive a next command and data from the host 2000.

When the flush of data is not required (that is, "NO" at step S350), the process proceeds to step S370 of deactivating the busy signal without performing step S360.

As described above, when the first firmware FW1 is operated in the normal mode, a delay may occur due to the performance of step S330 of polling the host interface 1201 and step S340 of checking the status of the buffer 1206 even if the available space of the buffer 1206 is present.

Figure 10B:
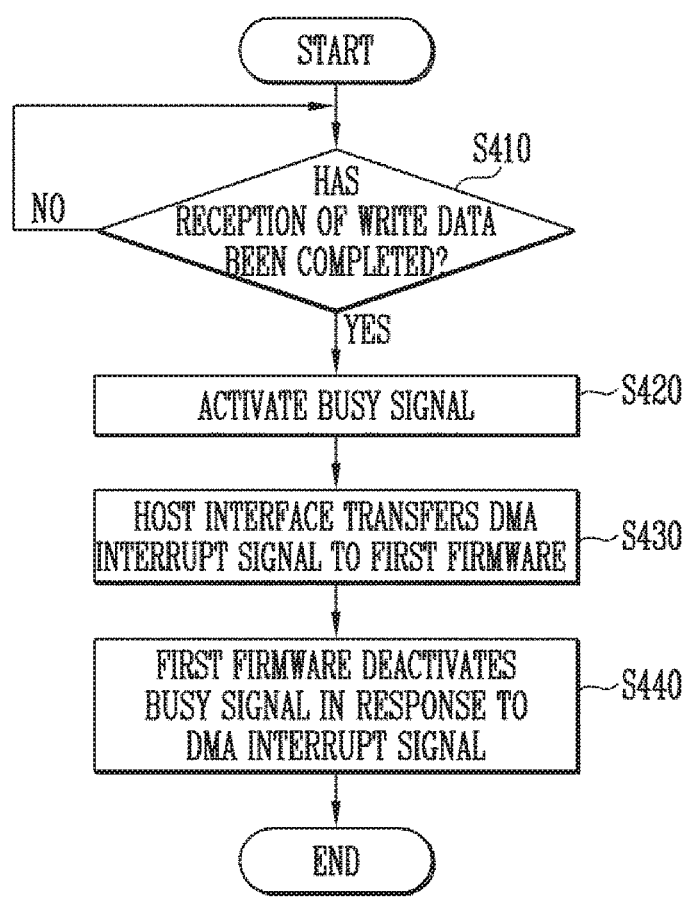
FIG. 10B is a flowchart describing an example of deactivating a busy signal in an interrupt mode described in FIG. 8.

FIG. 10B is a flowchart describing an example of step S170 of deactivating a busy signal in an interrupt mode.

Referring to FIG. 10B, when the first firmware FW1 is operated in the interrupt mode, it is determined whether the reception of write data has been completed at step S410. Step S410 may be performed by the host interface 1201. When the reception of write data is not completed (that is, "NO" at step S410), the host interface 1201 may continue to receive the write data.

When the reception of write data is completed (that is, "YES" at step S410), a busy signal is activated at step S420. Step S420 of activating the busy signal may be performed by the host interface 1201. Meanwhile, at step S430, the host interface 1201 transfers a DMA interrupt signal to the first firmware FW1. The DMA interrupt signal at step S430 may be a signal indicating that the transmission of data through direct memory access has been completed.

In FIG. 10B, step S430 is illustrated as being performed after step S420 has been performed. However, the present invention is not limited thereto. For example, steps S420 and S430 may be simultaneously performed.

Thereafter, at step S440, the first firmware FW1 may deactivate the busy signal in response to the DMA interrupt signal. When the DMA interrupt signal is received, the first firmware FW1 may suspend an operation currently being performed, and may primarily process a busy signal deactivation operation at step S440.

As described above with reference to FIG. 10A, when the first firmware FW1 is operated in the normal mode, the first firmware FW1 may deactivate the busy signal after verifying the completion of reception of write data through the polling of the host interface 1201. In contrast, as illustrated in FIG. 10B, when the first firmware FW1 is operated in the interrupt mode, the first firmware FW1 may deactivate the busy signal in response to the DMA interrupt signal received from the host interface 1201 at step S440. Accordingly, an overhead period depending on a polling cycle may be removed, and thus the active period of the busy signal may be shortened. As a result, the overall operating speed of the memory system 1000 may be improved.

Figure 11:
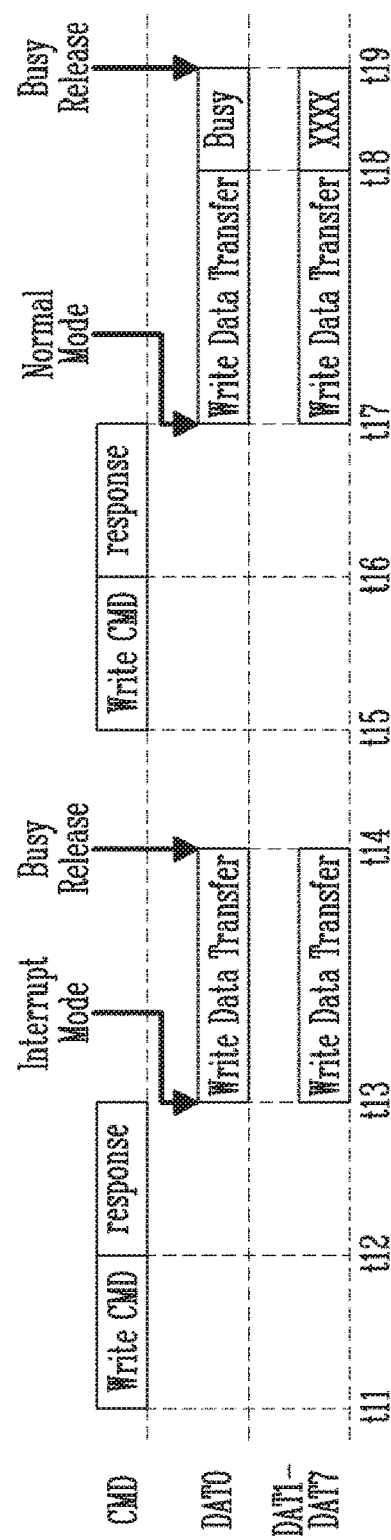
FIG. 11 is a timing diagram for explaining a method of operating a memory controller according to an embodiment of the present disclosure.

FIG. 11 is a timing diagram for explaining a method of operating the memory controller 1200 according to an embodiment of the present disclosure. FIG. 11 will be described with reference to FIGS. 6 to 10A and 10B.

Referring to FIG. 11, at time t11, a write command Write CMD is transferred from the host 2000 to the memory controller 1200 through a command line CMD at step S110. At time t12, the memory controller 1200 transfers a response signal to the write command Write CMD to the host 2000 through the command line CMD. Thereafter, at time t13, the memory controller 1200 sets the operation mode of the first firmware FW1 at step S130. In FIG. 11, a scenario for setting the operation mode of the first firmware FW1 to the interrupt mode at time t13 is illustrated.

In detail, when the write command Write CMD is transferred to the memory controller 1200, the first firmware FW1 may check the status of the memory controller 1200 at step S210, and may determine whether an interrupt mode is usable at step S230. In an example, when the size of the available space of the buffer 1206 is equal to or greater than a preset threshold, an available space is sufficient in the buffer 1206 and there is no need to perform a flush operation at a time point at which the reception of write data is completed, a busy signal may be immediately deactivated. In this case, the first firmware FW1 may be operated in the interrupt mode. As described above, when the interrupt mode is usable, the operation mode of the first firmware FW1 corresponding to the received write data is set to the interrupt mode at step S250.

In FIG. 11, the operation mode of the first firmware FW1 is illustrated as being set to the interrupt mode at time t13. However, the present invention is not limited thereto. For example, step S130 of FIG. 8 of setting the operation mode of the first firmware FW1 may be performed at time t12, which is a time point at which the reception of the write command Write CMD is completed, and also at time t14, which is a time point at which the transmission of the write data is completed. That is, step S130 of setting the operation mode of the first firmware FW1 may be performed either in parallel with the transfer of a response signal or in parallel with the reception of write data.

Next, the write data is transferred from the host 2000 to the memory controller 1200 through data lines DAT0 to DAT7 from the time point t13 at step S150. When the transfer of the write data is completed at time t14, the host interface 1201 may transfer a DMA interrupt signal to the first firmware FW1 at step S430. In response to the DMA interrupt signal, the first firmware FW1 may deactivate the busy signal at step S440.

Accordingly, the activation of the busy signal is terminated ("Busy Release") at almost the same time that the transfer of the write data is completed. As a result, a delay time, such as the period from t4 to t5 of FIG. 7, does not occur, and thereby the operating speed of the system 1000 may be improved.

Thereafter, at time t15, the write command Write CMD is transferred again from the host 2000 to the memory controller 1200 through the command line CMD at step S110. At time t16, the memory controller 1200 transfers a response signal to the write command Write CMD to the host 2000 through the command line CMD. Thereafter, at time t17, the memory controller 1200 sets the operation mode of the first firmware FW1 at step S130. In FIG. 11, a scenario for setting the operation mode of the first firmware FW1 to the normal mode at time t17 is illustrated.

In detail, when the write command Write CMD is transferred to the memory controller 1200, the operating status of the memory controller 1200 may be checked at step S210, and whether an interrupt mode is usable may be determined at step S230. When it is determined that the interrupt mode is unusable, the operation mode of the first firmware FW1 corresponding to the received write data is set to the normal mode at step S270. For example, when a flush of data is required due to insufficiency of the available space of the buffer 1206 (that is, the buffer 1206 is full of data), the operation mode of the first firmware FW1 may be set to the normal mode.

Thereafter, since time t17, the write data is transferred from the host 2000 to the memory controller 1200 through the data lines DAT0 to DAT7 at step S150. When the transfer of the write data is completed at time t18, the host interface 1201 activates the busy signal at step S320 as a result of the determination at step S310. In this procedure, the first firmware FW1 may verify whether the reception of write data has been completed by periodically polling the host interface 1201 at step S330.

When the completion of reception of the write data is verified as a result of polling the host interface 1201, the first firmware FW1 checks the status of the buffer 1206 at step S340. When it is determined at step S350 that a flush of data stored in the buffer is required, the data stored in the buffer is flushed at step S360. When the flush of data is completed, the first firmware FW1 may deactivate the busy signal at step S370. In contrast, when it is determined at step S350 that a flush of data stored in the buffer is not required, the first firmware FW1 may deactivate the busy signal without performing the flush of the data stored in the buffer at step S370.

When the reception of the write data is completed at time t18, the busy signal is activated, and the active state of the busy signal is maintained during a period from t18 to t19 in which steps S330 to S360 are performed.

As described above, in accordance with the memory controller 1200 and the method of operating the memory controller 1200 according to embodiments of the present disclosure, when a write command Write CMD is received, the operation mode of the first firmware FW1 is set depending on the status of the memory controller 1200. In a case where the operation mode of the first firmware FW1 is set to an interrupt mode, the activation of the busy signal is immediately terminated ("Busy Release") in response to the interrupt signal without a delay when the transfer of the write data is completed, and thus the operating speed of the memory system may be improved.

Figure 12:
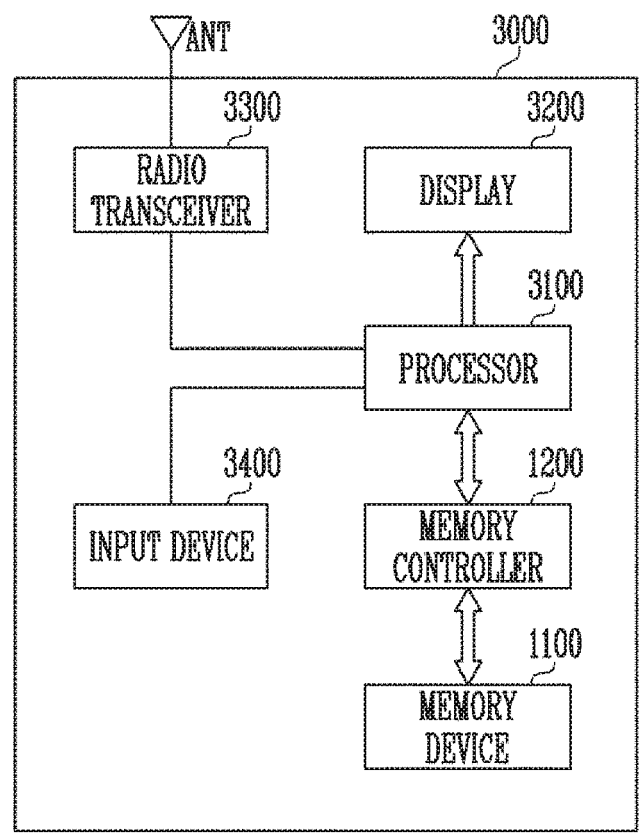
FIG. 12 is a diagram illustrating an embodiment of a memory system including the memory controller of FIGS. 1 and 6.

FIG. 12 is a diagram illustrating an embodiment of a memory system including the memory controller of FIGS. 1 and 6.

Referring to FIG. 12, a memory system 3000 may be implemented as a cellular phone, a smart phone, a tablet PC, a personal digital assistant (PDA) or a wireless communication device. The memory system 3000 may include a memory device 1100 and a memory controller 1200 that is capable of controlling the operation of the memory device 1100. The memory controller 1200 may control a data access operation for the memory device 1100, for example, a program operation, an erase operation or a read operation under the control of a processor 3100.

Data programmed to the memory device 1100 may be outputted via a display 3200 under the control of the memory controller 1200.

A radio transceiver 3300 may exchange radio signals through an antenna ANT. For example, the radio transceiver 3300 may change a radio signal received through the antenna ANT into a signal which may be processed in the processor 3100. Therefore, the processor 3100 may process a signal outputted from the radio transceiver 3300 and transmit the processed signal to the memory controller 1200 or the display 3200. The memory controller 1200 may program the signal processed by the processor 3100 to the memory device 1100. Furthermore, the radio transceiver 3300 may change a signal outputted from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 such that data outputted from the memory controller 1200, data outputted from the radio transceiver 3300, or data outputted from the input device 3400 is outputted via the display 3200.

In an embodiment, the memory controller 1200 capable of controlling the operation of the memory device 1100 may be implemented as a part of the processor 3100 or a chip provided separately from the processor 3100.

Figure 13:
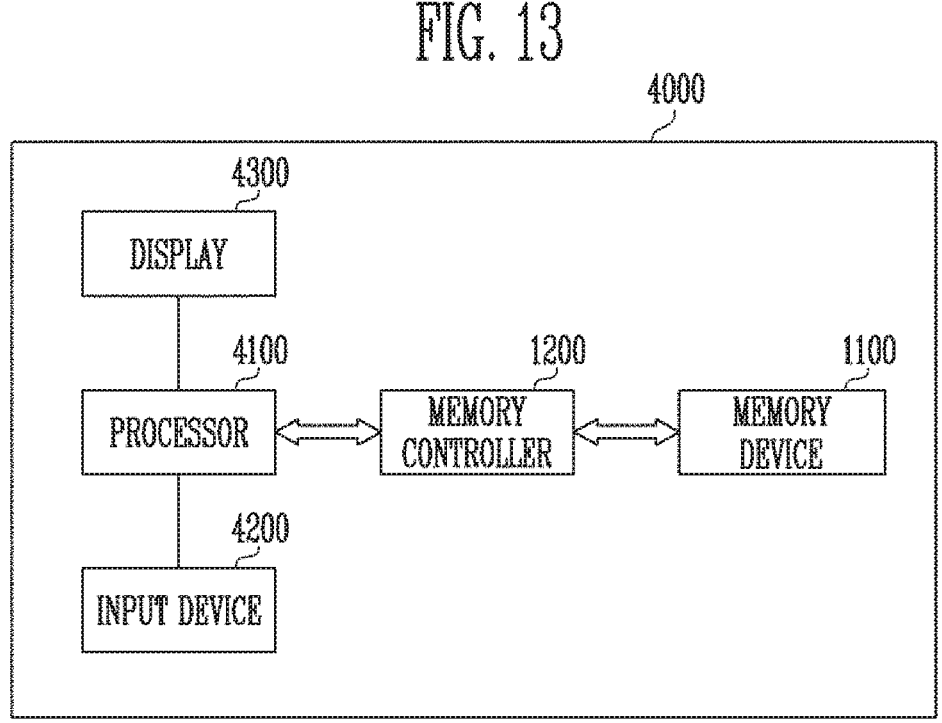
FIG. 13 is a diagram illustrating an embodiment of a memory system including the memory controller of FIGS. 1 and 6.

FIG. 13 is a diagram illustrating an embodiment of a memory system including the memory controller of FIGS. 1 and 6.

Referring to FIG. 13, a memory system 4000 may be embodied in a personal computer, a tablet PC, a net-book, an e-reader, a personal digital assistant (PDA), a portable multimedia player (PMP), an MP3 player, or an MP4 player.

The memory system 4000 may include a memory device 1100 and a memory controller 1200 that is capable of controlling a data processing operation of the memory device 1100.

A processor 4100 may output data stored in the memory device 1100 via a display 4300 according to data inputted from an input device 4200. For example, the input device 4200 may be implemented as a pointing device such as a touch pad or a computer mouse, a keypad or a keyboard.

The processor 4100 may control the overall operation of the memory system 4000 and control the operation of the memory controller 1200. In an embodiment, the memory controller 1200 capable of controlling the operation of the memory device 1100 may be implemented as a part of the processor 4100 or a chip provided separately from the processor 4100.

Figure 14:
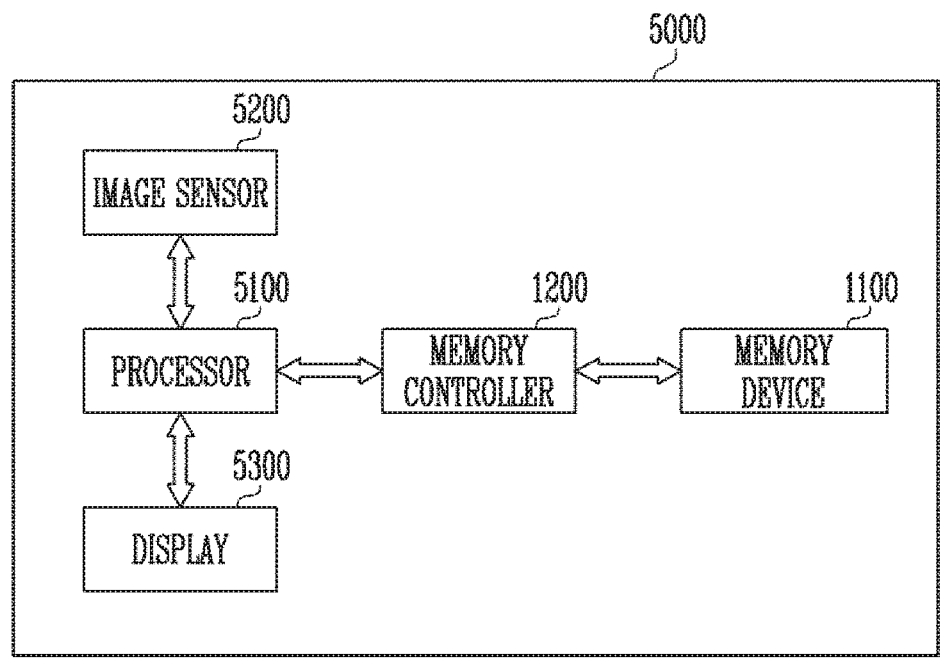
FIG. 14 is a diagram illustrating an embodiment of a memory system including the memory controller of FIGS. 1 and 6.

FIG. 14 is a diagram illustrating an embodiment of a memory system including the memory controller of FIGS. 1 and 6.

Referring to FIG. 14, a memory system 5000 may be embodied in an image processing device, e.g., a digital camera, a mobile phone provided with a digital camera, a smartphone provided with a digital camera, or a tablet PC provided with a digital camera.

The memory system 5000 may include a memory device 1100 and a memory controller 1200 that is capable of controlling a data processing operation of the memory device 1100, e.g., a program operation, an erase operation or a read operation.

An image sensor 5200 of the memory system 5000 may convert an optical image into digital signals. The converted digital signals may be transmitted to a processor 5100 or the memory controller 1200. Under the control of the processor 5100, the converted digital signals may be outputted via a display 5300 or stored in the memory device 1100 through the memory controller 1200. Data stored in the memory device 1100 may be outputted via the display 5300 under the control of the processor 5100 or the memory controller 1200.

In an embodiment, the memory controller 1200 capable of controlling the operation of the memory device 1100 may be implemented as a part of the processor 5100, or a chip provided separately from the processor 5100.

Figure 15:
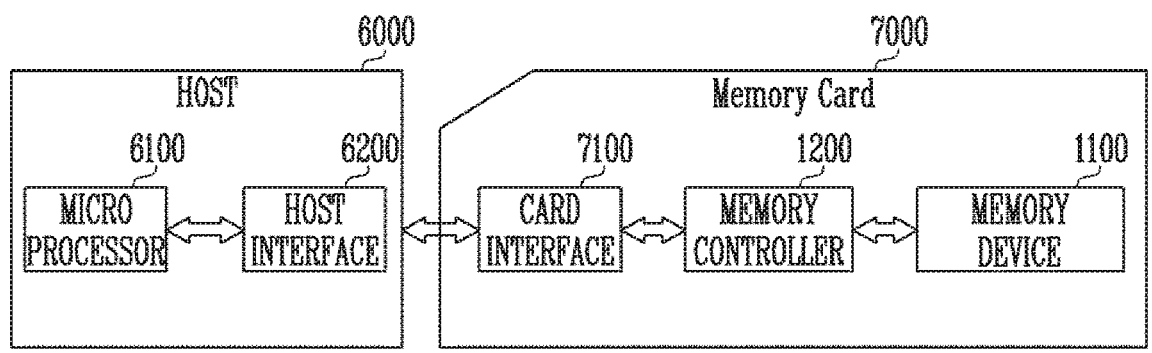
FIG. 15 is a diagram illustrating an embodiment of a memory system including the memory controller of FIGS. 1 and 6.

FIG. 15 is a diagram illustrating an embodiment of a memory system including the memory controller of FIGS. 1 and 6.

Referring to FIG. 15, a memory system 7000 may be embodied in a memory card or a smart card. The memory system 7000 may include a memory device 1100, a memory controller 1200, and a card interface 7100.

The memory controller 1200 may control data exchange between the memory device 1100 and the card interface 7100. In an embodiment, the card interface 7100 may be, but is not limited to, a secure digital (SD) card interface or a multi-media card (MMC) interface.

The card interface 7100 may interface data exchange between a host 6000 and the memory controller 1200 according to a protocol of the host 6000. In an embodiment, the card interface 7100 may support a universal serial bus (USB) protocol and an inter-chip (IC)-USB protocol. Here, the card interface may refer to hardware capable of supporting a protocol which is used by the host 6000, software installed in the hardware, or a signal transmission method.

When the memory system 7000 is coupled to a host interface 6200 of the host 6000, such as a PC, a tablet PC, a digital camera, a digital audio player, a mobile phone, console video game hardware or a digital set-top box, the host interface 6200 may perform data communication with the memory device 1100 through the card interface 7100 and the memory controller 1200 under the control of a microprocessor 6100.

In FIG. 15, an embodiment in which the memory system 7000 is implemented as a memory card is illustrated. However, the present disclosure is not limited to such an embodiment, and the memory controller 1200 and the memory device 1100 may be integrated into a single semiconductor device, thus forming a solid state drive (SSD). The SSD may include a storage device configured to store data in a semiconductor memory.

In accordance with an embodiment of the present disclosure, there may be provided a memory controller, which has an improved operating speed.

In accordance with an embodiment of the present disclosure, there may be provided a method of operating a memory controller having improved operating performance.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

What is claimed is:

1. A memory controller for controlling a write operation of a memory device in response to a write command received from a host, comprising:
 a host interface configured to receive write data corresponding to the write command from the host;
 a buffer configured to temporarily store the write data;
 a first processor configured to control operations of the host interface and the buffer; and
 a second processor configured to control the buffer and the memory device to store the write data in the memory device,
 wherein the first processor, in response to a reception of the write command, sets an operation mode which determines whether to output a busy signal, based on a size of an available space of the buffer,
 wherein the second processor flushes data stored in the buffer to the memory device according to the operating mode,
 wherein the busy signal prevents receiving a new write command which is followed after the write command from the host, and
 wherein the first processor executes first firmware and the second processor executes second firmware, respectively.

2. The memory controller according to claim 1, wherein the operation mode includes an interrupt mode and a normal mode.

3. The memory controller according to claim 2,
 wherein the host interface activates a status signal if a reception of the write data is completed, and
 wherein the first processor verifies, if the first processor is operated in the normal mode, the reception of the write data by polling the host interface, and deactivates the status signal based on a status of the buffer.

4. The memory controller according to claim 2,
 wherein the host interface activates a status signal and outputs an interrupt signal to the first processor when the first processor is operated in the interrupt mode, and
 wherein the first processor terminates an active state of the status signal in response to the interrupt signal.

5. The memory controller according to claim 4, wherein the host interface receives the write data using a direct memory access (DMA) scheme.

6. The memory controller according to claim 5, wherein the host interface comprises a DMA controller.

7. The memory controller according to claim 6, wherein, when a reception of the write data is completed, the DMA controller generates the interrupt signal.

8. The memory controller according to claim 7, wherein the interrupt signal is a signal indicating that the reception of the write data using the DMA scheme has been completed.

9. A method of operating a memory controller including a first processor configured to control operations between a host and the memory controller and a second processor configured to control operations between the memory controller and a memory device, the method comprising:
 receiving, by the first processor, a write command from the host;
 setting, by the first processor, an operation mode according to a size of an available space of a buffer;
 receiving, by the first processor, write data corresponding to the write command through a host interface;
 outputting, by the first processor, a status signal in response to a completion of a reception of the write data;
 flushing, by the second processor, data stored in the buffer to the memory device; and
 deactivating, by the first processor, the status signal after the flushing of the data stored in the buffer to the memory device,
 wherein the first processor executes first firmware and the second processor executes second firmware.

10. The method according to claim 9, wherein the setting of the operation mode according to the size of the available space of the buffer includes setting, in response to the size of the available space of the buffer, being less than a preset threshold, the operation mode of the first firmware to a normal mode.

11. The method according to claim 9, wherein the setting of the operation mode according to the size of the available space of the buffer includes setting, in response to the size of the available space of the buffer, being equal to or greater than a preset threshold, the operation mode of the first firmware to an interrupt mode.

12. The method according to claim 9, wherein the first processor controls the reception of the write data from the host.

13. The method according to claim 9, wherein the second firmware comprises a Flash Translation Layer (FTL).

* * * * *